(12) United States Patent
Smith et al.

(10) Patent No.: US 8,867,599 B2
(45) Date of Patent: Oct. 21, 2014

(54) EQUALIZATION OF TRANSMISSIONS

(71) Applicants: Dale T Smith, San Jose, CA (US); Eric J Lanning, San Jose, CA (US)

(72) Inventors: Dale T Smith, San Jose, CA (US); Eric J Lanning, San Jose, CA (US)

(73) Assignee: SerialTek, LLC, San Jose, CA (US)

( * ) Notice: Subject to any disclaimer, the term of this patent is extended or adjusted under 35 U.S.C. 154(b) by 0 days.

(21) Appl. No.: 13/763,916

(22) Filed: Feb. 11, 2013

(65) Prior Publication Data

US 2013/0301696 A1   Nov. 14, 2013

Related U.S. Application Data

(60) Provisional application No. 61/646,078, filed on May 11, 2012.

(51) Int. Cl.
   *H03H 7/30*      (2006.01)
   *H04L 1/24*      (2006.01)
   *H04L 25/03*     (2006.01)

(52) U.S. Cl.
   CPC ............ *H04L 1/24* (2013.01); *H04L 25/03006* (2013.01)

USPC ........... 375/229; 375/224; 375/227; 375/230; 375/231; 375/232; 375/296

(58) Field of Classification Search
   CPC .......................... H04L 1/24; H04L 25/03006
   USPC .......... 375/224, 227, 229, 230, 231, 232, 296
   See application file for complete search history.

(56) References Cited

U.S. PATENT DOCUMENTS 8,050,618 B2 * 11/2011 Kwun et al. ...................... 455/7

* cited by examiner

*Primary Examiner* — Leon Flores
(74) *Attorney, Agent, or Firm* — Douglas L. Weller (57) ABSTRACT

Transmissions from mid-bus test equipment to a first device and from a second device to the mid-bus test equipment are equalized. Equalization instructions are passed from the first device through the mid-bus test equipment to the second device. The mid-bus test equipment changes the quality of transmissions sent to the first device in order to steer the first device to produce equalization instructions that will produce optimized transmissions from the mid-bus test equipment to the first device and from the second device to the mid-bus test equipment.

20 Claims, 5 Drawing Sheets

EQUALIZATION OF TRANSMISSIONS

BACKGROUND

Mid-bus test equipment, such as analyzers and jammers, are connected in the middle of a bus between devices that are communicating with each other. For example, protocol analyzers are used to capture, examine, and debug the complex protocols used by storage and networking busses. Jammers, which are also called error injectors, are used to modify a transmission in order to test for proper recovery from errors, or to test for proper handling of unusual protocol sequences. Modern point-to-point busses transfer gigabytes per second on each differential transmission line of a network bus or a storage bus. For a bus that operates point-to-point, it is often difficult to tap into the bus to connect mid-bus test equipment without degrading signal quality of transmissions over the bus.

Tapping into a transmission line of a bus degrades transmitted signals because the tapping can redirect a portion of the signal and can also change the impedance of the transmission line, creating signal reflections. As an alternative to tapping into a transmission line, mid-bus test equipment often use a technique of terminating the received signal and then retransmitting it again as a clean new point-to-point signal with full strength.

One example of a point-to-point bus is a serial attached small computer standard interface (SAS). SAS uses an equalization protocol called transmitter training (Tx Training) that allows the receiver of the signal to adjust the equalization parameters or coefficients used by the transmitter, thus optimizing the transmitter frequency profile. Tx Training allows the receiver to compensate for the frequency profile of the transmission line resulting in a much cleaner signal at the receiver.

DETAILED DESCRIPTION

Figure 1:
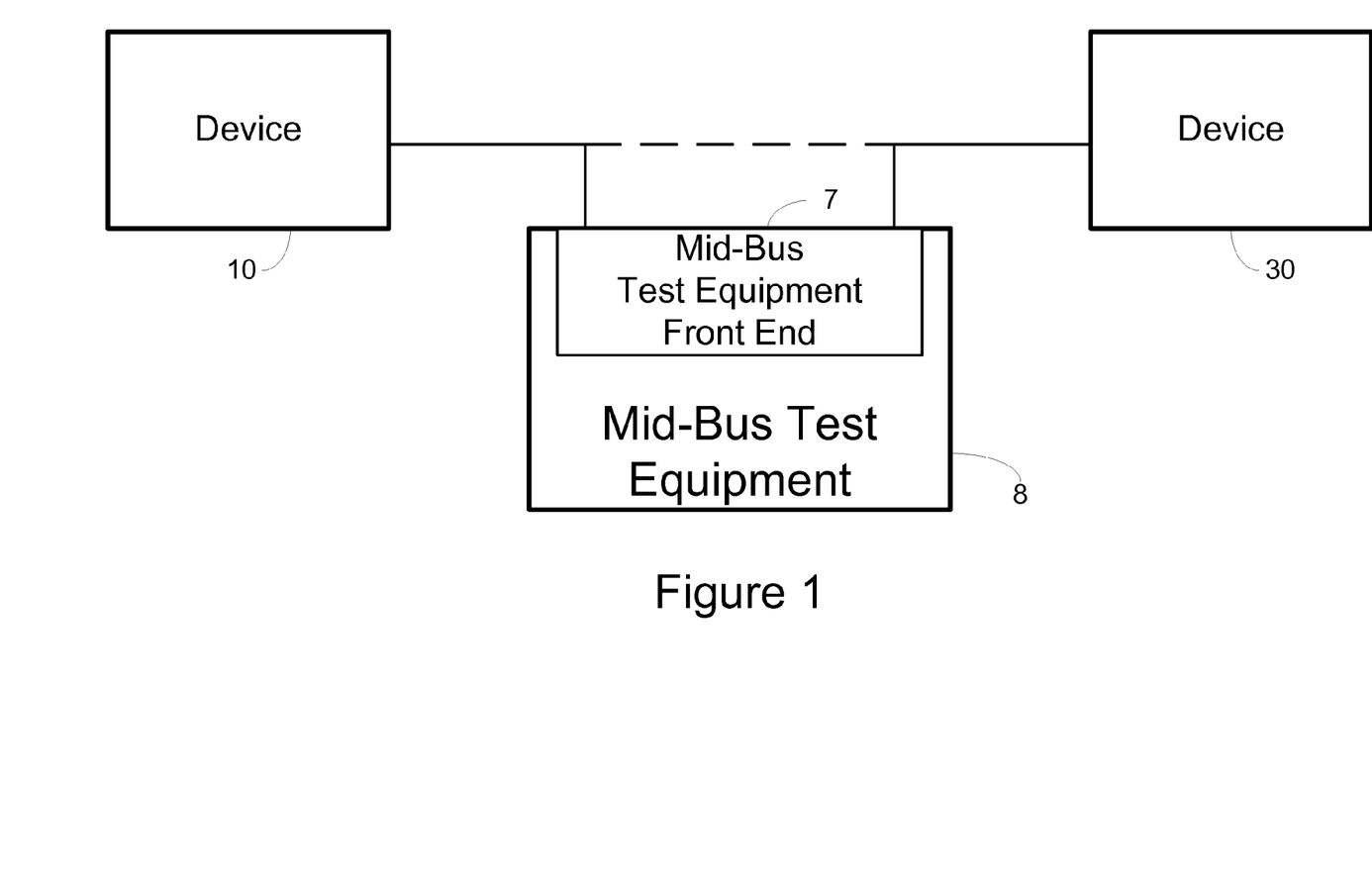
FIG. 1 is a simplified block diagram showing mid-bus test equipment placed so as to intercept transmissions exchanged between two devices over a point-to-point bus in accordance with an implementation.

FIG. 1 shows mid-bus test equipment 8, having mid-bus test equipment front-end 7, placed between a device 10 and a device 30 so as to break a point-to-point bus between device 10 and device 30 into two separate point-to-point segments. Mid-bus test equipment front-end 7 responds to equalization requests from device 10 and device 30 so that each of device 10 and device 30 performs equalization normally unaware that mid-bus test equipment 8 is intercepting signals between the two devices.

Figure 2:
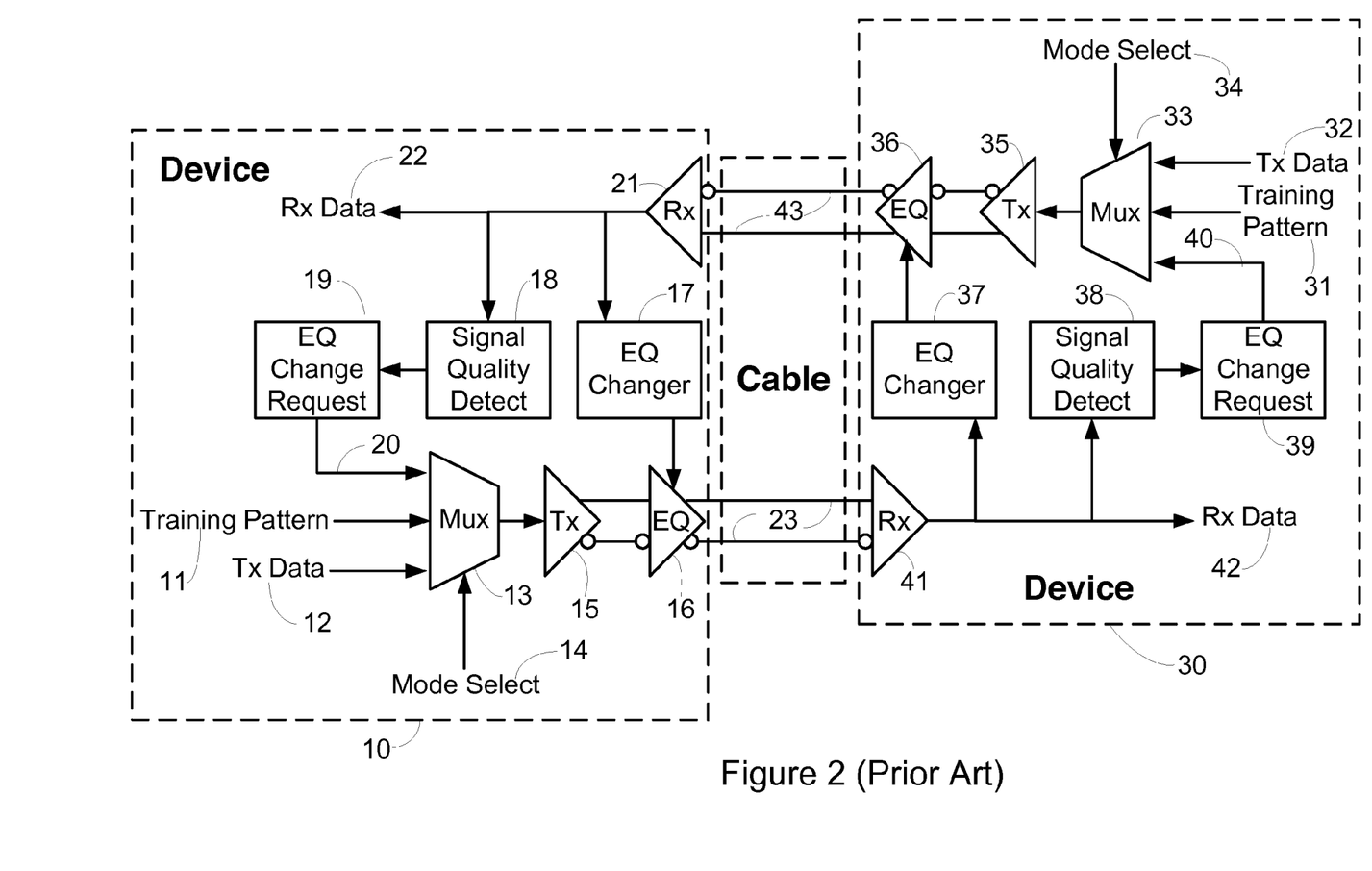
FIG. 2 is a simplified block diagram of the two devices shown in FIG. 1, as the two devices communicate over a point-to-point bus in accordance with the prior art.

FIG. 2 shows a block diagram of device 10 and device 30 connected by transmission lines of a point-to-point bus. That is, device 10 is connected to device 30 via a differential pair 43, and a differential pair 23.

When in a transmit data mode, a mode select 14 within device 10 causes multiplexor 13 to select transmit data 12 to be connected to a transmitter 15. An equalizer 16 equalizes the transmitted data before transmission across differential pair 23 to a receiver 41 of device 30. Receiver 41 forwards received data 42 for further processing within device 30 or within another processing device.

Likewise, when in a transmit data mode, a mode select 34 within device 30 causes multiplexor 33 to select transmit data 32 to be connected to a transmitter 35. An equalizer 36 equalizes the transmitted data before transmission across differential pair 43 to a receiver 21 of device 10. Receiver 21 forwards received data 22 for further processing within device 10 or within another processing device.

When in a training mode to equalize data sent over differential pair 23, mode select 14 within device 10 causes multiplexor 13 to select training pattern 11 to be connected to a transmitter 15. Equalizer 16 equalizes the training pattern before transmission across differential pair 23 to receiver 41 of device 30. A signal quality detector 38 determines whether the currently received training pattern is better or worse than a previously received training pattern. Based on the result of the determination and the results of previous training patterns, a decision is made on a direction and type of equalization change to be requested. An equalization change request block 39 generates an equalization change request in a form in accordance with the protocol standard and places it on an input 40 of multiplexor 33. Mode select 34 causes multiplexor 33 to forward the equalization request to transmitter 35. Equalizer 36 equalizes the transmission across differential pair 43 to receiver 21 of device 10. An equalization changer 17 receives the equalization request from receiver 21 and adjust the equalization coefficients of equalizer 16.

Likewise, when in a training mode to equalize data sent over differential pair 43, mode select 34 within device 30 causes multiplexor 33 to select training pattern 31 to be connected to a transmitter 35. Equalizer 136 equalizes the training pattern before transmission across differential pair 43 to receiver 21 of device 10. A signal quality detector 18 determines whether the currently received training pattern is better or worse than a previously received training pattern. Based on the result of the determination and the results of previous training patterns, a decision is made on a direction and type of equalization change to be requested. An equalization change request block 19 generates an equalization change request in a form in accordance with the protocol standard and places it on an input 20 of multiplexor 13. Mode select 14 causes multiplexor 13 to forward the equalization request to transmitter 15. Equalizer 16 equalizes the transmission across differential pair 23 to receiver 41 of device 20. An equalization changer 37 receives the equalization request from receiver 41 and adjusts equalization coefficients of equalizer 36.

Figure 3:
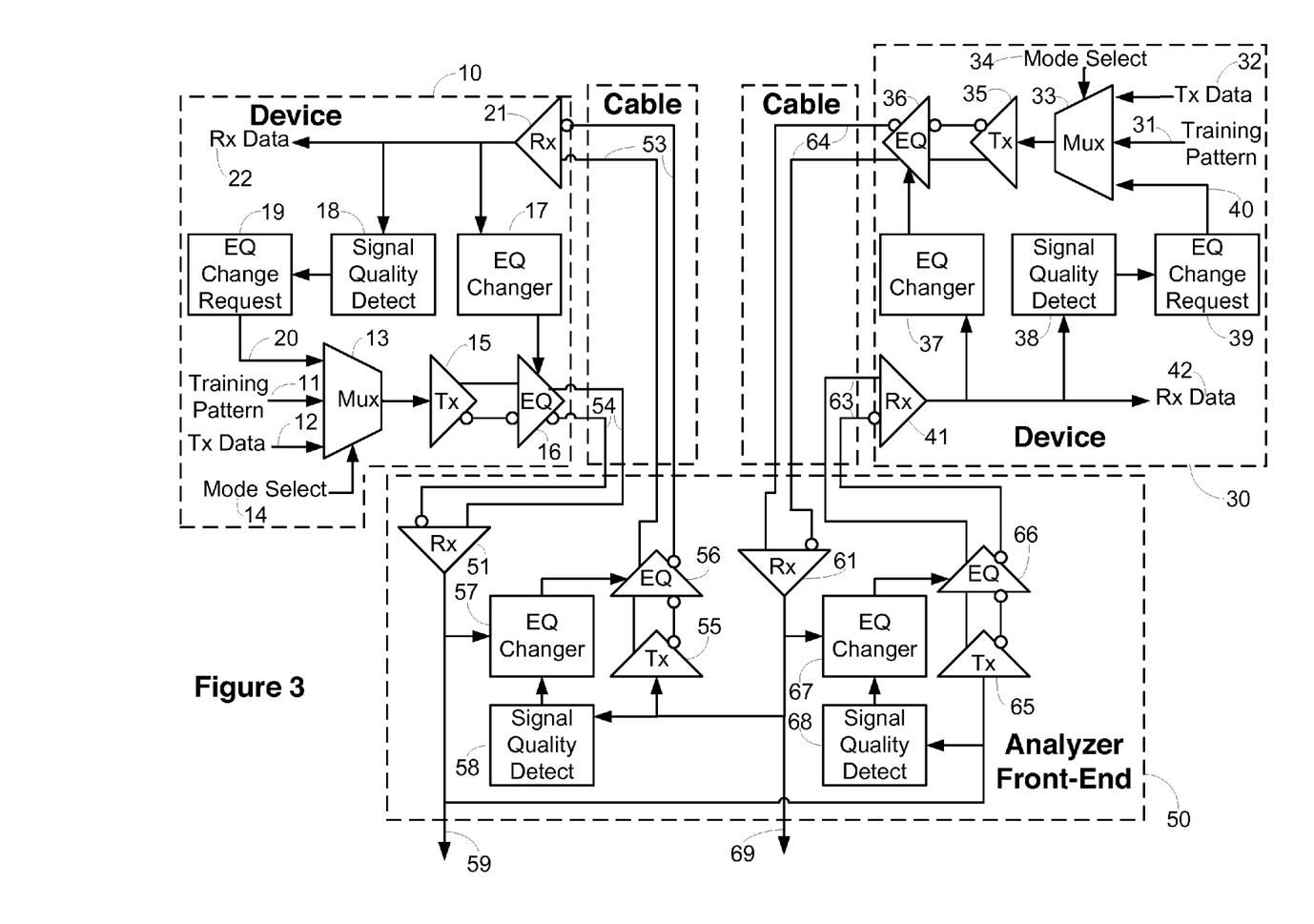
FIG. 3 is a simplified block diagram of an analyzer placed so as to receive and retransmit signals exchanged over the point-to-point bus shown in FIG. 2 in accordance with an implementation.

FIG. 3 shows mid-bus test equipment intercepting communications between device 10 and device 30. Particularly, as shown in FIG. 3, the mid-bus test equipment is an analyzer and an analyzer front end 50 intercepts communications between device 10 and device 30.

When in a transmit data mode, mode select 14 within device 10 causes multiplexor 13 to select transmit data 12 to be connected to transmitter 15. Equalizer 16 equalizes the transmitted data before transmission across differential pair 54 to a receiver 51 of analyzer front-end 50. A tap 59 allows the transmitted data to be monitored for analysis by analyzer 9 or another processing system. Receiver 51 forwards received data to a transmitter 65. An equalizer 66 equalizes the transmitted data before transmission across differential pair 63 to receiver 41 of device 30. Receiver 41 forwards received data 42 for further processing within device 30 or within another processing device.

Likewise, when in a transmit data mode, mode select 34 within device 30 causes multiplexor 33 to select transmit data 32 to be connected to transmitter 35. Equalizer 36 equalizes the transmitted data before transmission across differential pair 64 to a receiver 61 of analyzer front-end 50. A tap 69 allows the transmitted data to be monitored for analysis by analyzer 9 or another processing device. Receiver 61 forwards received data to a transmitter 55. An equalizer 56 equalizes the transmitted data before transmission across differential pair 53 to receiver 21 of device 10. Receiver 21 forwards received data 22 for further processing within device 10 or within another processing device.

When in a training mode to equalize data, mode select 14 within device 10 causes multiplexor 13 to select training pattern 11 to be connected to a transmitter 15. Equalizer 16 equalizes the training pattern before transmission across differential pair 54 to receiver 51 of analyzer front-end 50. Receiver 51 forwards the received training pattern to transmitter 65. Tap 59 allows the received training pattern to be monitored for analysis. Equalizer 66 equalizes the training pattern before transmission across differential pair 63 to receiver 41 of device 30. Signal quality detector 38 determines whether the currently received training pattern is better or worse than a previously received training pattern. Based on the result of the determination and the results of previous training patterns, a decision is made on a direction and type of equalization change to be requested.

Equalization change request block 39 generates an equalization change request in a form in accordance with the protocol standard and places it on input 40 of multiplexor 33. Mode select 34 causes multiplexor 33 to forward the equalization request to transmitter 35. Equalizer 36 equalizes the transmission across differential pair 64 to receiver 61 of analyzer front-end 50. An equalization changer 67 receives the equalization request from receiver 61 and adjusts equalization coefficients of equalizer 66 as will be described further below. Receiver 61 forwards the received training pattern to transmitter 55. Tap 69 allows the received training pattern to be monitored for analysis. Equalizer 56 equalizes the training pattern before transmission across differential pair 53 to receiver 21 of device 10. An equalization changer 17 receives the equalization request from receiver 21 and adjusts equalization coefficients of equalizer 16.

Likewise, when in a training mode to equalize data, mode select 34 within device 30 causes multiplexor 33 to select training pattern 31 to be connected to a transmitter 35. Equalizer 36 equalizes the training pattern before transmission across differential pair 64 to receiver 61 of analyzer front-end 50. Receiver 61 forwards the received training pattern to transmitter 55. Tap 69 allows the received training pattern to be monitored for analysis. Equalizer 56 equalizes the training pattern before transmission across differential pair 53 to receiver 21 of device 10. Signal quality detector 18 determines whether the currently received training pattern is better or worse than a previously received training pattern. Based on the result of the determination and the results of previous training patterns, a decision is made on a direction and type of equalization change to be requested.

Equalization change request block 19 generates an equalization change request in a form in accordance with the protocol standard and places it on input 20 of multiplexor 13. Mode select 14 causes multiplexor 13 to forward the equalization request to transmitter 15. Equalizer 16 equalizes the transmission across differential pair 54 to receiver 51 of analyzer front-end 50. An equalization changer 57 receives the equalization request from receiver 51 and adjusts equalization coefficients of equalizer 56 as will be described further below. Receiver 51 forwards the received training pattern to transmitter 65. Tap 59 allows the received training pattern to be monitored for analysis. Equalizer 66 equalizes the training pattern before transmission across differential pair 63 to receiver 41 of device 30. An equalization changer 37 receives the equalization request from receiver 41 and adjusts equalization coefficients of equalizer 36. Alternatively, analyzer transmitters 55 and 65 can be implemented as re-timing transmitters, which transmit the data on an internally generated clock rather than transmitting the original signal's timing and associated jitter.

For testing purposes, it would be best if transmissions over differential pair 54 and differential pair 63 had exactly the same characteristics as transmissions over differential pair 23 and if transmissions over differential pair 64 and differential pair 53 had exactly the same characteristics as transmissions over differential pair 43 so that device 10 and device 30 would make exactly the same equalization requests with or without analyzer 50 intercepting point-to-point communications. Also, this would allow equalization changer 57 to change the values in equalizer 56 exactly in accordance with change requests generated by equalization change request block 19 and would allow equalization changer 67 to change the values in equalizer 56 exactly in accordance with change requests generated by equalization change request block 39.

However, it is rarely if ever the case that transmissions over differential pair 54 and differential pair 63 have exactly the same characteristics as transmissions over differential pair 23 and that transmissions over differential pair 64 and differential pair 53 have exactly the same characteristics as transmissions over differential pair 24. As a result, the training that provides equalization changes will vary based on whether analyzer front-end 50 is in place to intercept transmissions.

Analyzer front-end 50 does not include an equalization change request block so no equalization change requests come from analyzer 9. In the implementation shown in FIG. 3, the only equalization change requests come from equalization change request block 19 and equalization change request block 39. The implementation shown in FIG. 3, however, still assures that after equalization training is complete, the signal quality requirements are satisfied for transmissions between analyzer front-end 50 and device 10 and for transmissions between analyzer front-end 50 and device 30. This is accomplished, for example, by changing the quality of transmissions from analyzer front-end 50 in order to steer the equalization requests made by a device.

Figure 4:
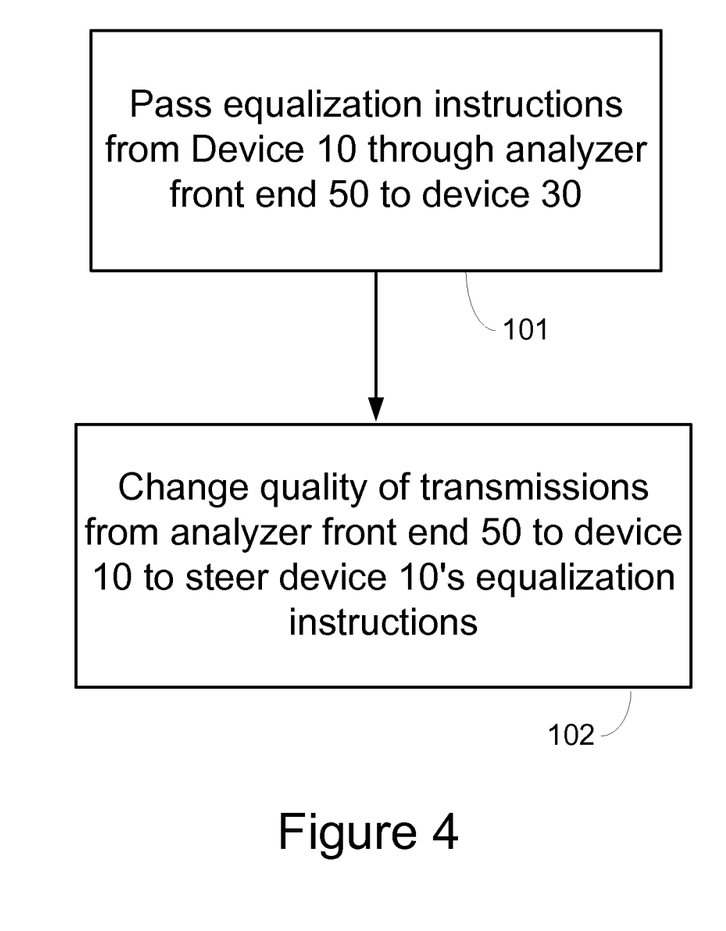
FIG. 4 is a simplified flow chart that illustrates the analyzer changing transmission quality to steer equalization instructions from the devices.

For example, FIG. 4 is a simplified flow chart that illustrates analyzer front-end 50 changing transmission quality to steer equalization instructions from device 10 and device 30. While in the examples given below analyzer front-end 50 changes transmission quality to device 10 in order to steer equalization instructions from device 10, analyzer front-end 50 can make the same type of changes to transmission quality for transmissions to device 30 in order to steer equalization instructions from device 30.

Specifically, in a block 101, analyzer front-end 50 passes equalization instructions from device 10 directly to device 30. In a block 102, analyzer front-end changes the quality of transmissions from analyzer front-end 50 to device 10 in order to steer device 10 to produce equalization instructions that will produce optimized transmissions from analyzer front-end 50 to first device 10 and from device 30 to analyzer front-end 50.

For example, the quality of transmission can be changed by changing transmission parameters so as to affect the amplitude or timing margin of the received eye opening in the data transmission. For example, the quality of transmission can be changed by forcing an electrical idle state, adding timing jitter to a transmission, reducing the output amplitude of a transmission, otherwise changing equalization parameters or by some other means that alters the transmission in a way that will be detected by device 10. The quality of transmission can also be changed by sending bad data. That is the transmitted data can be changed so that device 10 does not receive a particular data pattern it is expecting to receive. For example, if device 10 is expecting to receive a particular data pattern, analyzer front end 50 can send "bad data", that is, analyzer front end 50 can send a data pattern that is inverted or in some other way altered so that device 10 receives a different than expected data pattern.

The quality of transmission is changed for the purpose of steering device 10 to produce equalization instructions that will produce optimized transmissions from analyzer front-end 50 to first device 10 and from device 30 to analyzer front-end 50. For example, a user of analyzer front-end 50 can determine optimized equalization values for equalizer 56 and equalizer 66 before device 10 and device 30 conduct training. For example, correct equalization settings for equalizer 56 can be detected by analyzer front-end 50 trying different settings, and then sending billions of bits to receiver 21 of device 10 to determine the error rate. By doing this on each of the different settings, a range of settings that produces no errors can be found. An optimized equalization setting will be, for example, in a middle of the range of settings that produce no errors.

Likewise, correct equalization settings for equalizer 66 can be detected by analyzers front-end 50 trying different settings, and then sending billions of bits to receiver 41 of device 30 to determine the error rate. By doing this on each of the different settings, a range of settings that produces no errors can be found. An optimized equalization setting will be, for example, in a middle of the range of settings that produce no errors. A similar process can be used to find an optimized equalization setting for equalizer 16 and equalizer 36 with an optimized setting for each equalizer being in a middle of the range that produces no errors.

Once optimized equalization settings are known, analyzer front-end 50 can steer the training mode to, at least roughly, simulate a training mode for a point-to-point connection between device 10 and device 30 and that will result in equalized transmissions between device 10 and analyzer front-end 50 and between device 30 and analyzer front-end 50.

For example, analyzer front-end 50 can start with initial equalization values that are calculated offsets from a desired final result. The initialized equalization values that will cause the device 10 and device 30 to request equalization changes in the correct direction and magnitude, resulting in analyzer front-end 50, device 10 and device 30 receiving optimally equalized signals despite disparate input channel characteristics. The initial equalized values used by analyzer front-end 50 replace pre-defined equalized settings used in a standard protocol for performing training to obtain equalization values.

For example, in the SAS equalization training protocol (Tx Training), an equalization change request block can request changes to three different equalization parameters, or coefficients, called Pre-Cursor (c1), Cursor (c2), and Post-Cursor (c3). The Pre-Cursor coefficient adjusts the transmitter gain during the bit time preceding a transition. The Cursor coefficient adjusts the transmitter gain for steady-state signals, and the Post-Cursor coefficient adjusts the transmitter gain during the bit time following a transition. It is possible to force electrical idle by reducing the output amplitude (cursor (c2)) all the way.

When transmitting, an equalizer, such as equalizer 16 in device 10, determines if the data consists of high frequency, medium frequency, or low frequency data. The equalizer does this by looking at three transmission bits at a time, the Pre-cursor, Cursor, and Post-cursor. If all three bits are the same, it is a low-frequency transmission. If there is one bit-change in the three bits it is a medium frequency transmission. If there is a two-bit change it is a high-frequency transmission. The Pre-cursor, Cursor, and Post-cursor bits each have an effect on the amplitude of the output. When the pre-cursor bit transitions amplitude is reduced by between 0 and 20%. When the Cursor bit transitions, amplitude increases by between 50% and 100%. When the Post-cursor bit transitions the amplitude decreases by between 0 and 35%. The output gain is the highest when the frequency, or number of transitions is the highest, and the output gain is the smallest when the frequency is the lowest. The actual contribution of each coefficient is determined during the Tx Training protocol.

In order to steer change requests from equalization change request block 19 of device 10, analyzer front-end 50 can replace pre-defined equalized settings placed in equalizer 56, as is illustrated herein using only the Pre-Cursor equalization. Supposed optimized equalization settings have already been calculated as described above. As a result of the calculation, analyzer 9 knows that to compensate for channel attenuation, an optimized Pre-Cursor to be used in equalizer 56 for transmitting to device 10 is a boost of two units. In this example, analyzer front-end 50 requires higher attenuation, so an optimized Pre-Cursor equalization for equalizer 36 when transmitting to analyzer front-end 50 is three units. In the standard SAS Tx Training protocol, device 10 prior to Tx Training might initialize equalizer 36 of device 30 to start with two units of Pre-Cursor boost, which is one unit lower than analyzer front-end 50 needs to optimally receive transmissions. To get device 10 to request one unit of Pre-Cursor boost for analyzer front-end 50, analyzer front-end 50 initializes equalizer 56 to one unit of Pre-Cursor boost.

When Tx Training is about to begin, device 10 requests a specific equalization setting of two units, which analyzer front-end 50 considers to be the initial setting of device 30's transmitter for purposes of calculating analyzer front-end 50 initial offsets. Equalization changer 57 of analyzer front-end 50 is configured to ignore requests from device 10 to adopt a specific equalization setting. Equalization changer 57 of analyzer front-end 50 only adjusts equalization in equalizer 56 in response to requests to increment or decrement the current setting. Analyzer front-end 50 forwards the request for an equalization setting of two units to device 30 and equalization changer 37 sets the Pre-cursor coefficient to two units. Equalization changer 57 of analyzer front-end 50 sets the Pre-cursor coefficient in equalizer 56 to two one unit.

Signal quality detector 18 detects received transmissions from analyzer front-end 50 are not optimal. As a result, Equalization change request block 19 of device 10 requests one unit of boost. Both analyzer front-end 50 and device 30, in response to the request, add one unit of boost to their Pre-Cursor coefficient in equalizer 56 and equalizer 36, respectively, giving device 10 the two units of boost it desires, and analyzer front-end 50 is now receiving the three units of boost it desires.

The following equation is used for determining the initial equalization offset used by analyzer front-end 50 in equalizer 56:

$$AITx = D10Rx - (ADRx - D30Tx),$$

where AITx is the analyzer initial transmit value for a coefficient in equalizer 56, D10Rx is the predetermined optimized coefficient value for device 10 to receive from equalizer 56, ADRx is the predetermined optimized value for the analyzer to receive from equalizer 36 and D30Tx is the initial value for the coefficient that device 10 requests to be transmitted by equalizer 36.

In some cases, analyzer front-end 50 may need to provide negative units of boost, which can be accomplished using the initial offset solution for steering described above. Another advantage of the above-described initial offset solution is that it can be performed without a signal quality detector. That is, signal quality detector 58 and signal quality detector 68 are shown in FIG. 3 but are not needed to perform the initial offset solution.

When there are big differences between optimized transmission equalization settings requested by device 10 and the optimized transmission equalization settings desired by analyzer front-end 50, merely using an initial offset solution may not be most expedient. In this case, for example, analyzer front-end 50 can adjust equalization coefficients in equalizer 56 a different amount than is requested by equalization change request block 19 in device 10. That is, analyzer front-end 50 can differ the amount of boost to a coefficient. This differential boost can be instead of, or in addition to, placing different initial values in equalizer 56 than are placed in equalizer 36.

For example, suppose the predetermined optimized value for a coefficient in equalizer 56 is two units, a predetermined optimized value in equalizer 36 is three units and two units is the initial value for the coefficient that device 10 requests to be placed in equalizer 36.

In this case, for example, equalization changer 57 of analyzer front-end 50 initializes the coefficient in equalizer 56 to zero units and boosts the coefficient in equalizer 56 two units for every unit of boost requested by equalization change request block 19. When equalization change request block 19 requests an initial value of two units for an equalizer, analyzer front-end 50 forwards this request to device 30 but leaves the coefficient value in equalizer 56 at zero units. Device 30 initializes the coefficient value in equalizer 36 to two units.

When equalization change request block 19 in device 10 requests a boost of one unit, equalization changer 57 in analyzer front-end 50 boosts the coefficient in equalizer 56 two units and the single unit boost request is forwarded to device 30. Equalization changer 37 in device 30 boosts the coefficient in equalizer 36 one unit. Now the coefficient in equalizer 56 is at two units and the coefficient in equalizer 36 is at three units which are the predetermined optimized values For example, the following equation is used for determining the initial equalization offset used by analyzer front-end 50 when analyzer front-end 50 multiplies each request by two:

$$AITx = (D10Rx)/2 - (ADRx - D30Tx),$$

where AITx is the analyzer initial transmit value for a coefficient in equalizer 56, D10Rx is the predetermined optimized coefficient value for device 10 to receive from equalizer 56, ADRx is the predetermined optimized value for the analyzer to receive from equalizer 36 and D30Tx is the initial value for the coefficient that device 10 requests to be transmitted by equalizer 36.

While the above example shows analyzer front-end 50 exaggerating its transmission equalization response by a factor of two, the exaggeration could be any multiple of a unit, or fraction of a unit.

In order to implement a fractional step size, equalization changer 57 of analyzer front-end 50 can ignore some requests for boosts. For example, suppose the predetermined optimized value for a coefficient in equalizer 56 is two units, a predetermined optimized value in equalizer 36 is four units and zero units is the initial value for the coefficient that device 10 requests to be placed in equalizer 36.

Equalization changer 57 of analyzer front-end 50 initializes the coefficient in equalizer 56 to one unit and then ignores three out of four boost requests. This results in equalization changer 57 of analyzer front-end 50 boosting the coefficient in equalizer 56 one unit for every four units of boost requested by equalization change request block 19.

In this case, equalization change request block 19 requests an initial value of zero units for the transmitter. Analyzer front-end 50 forwards this request to device 30 but leaves the coefficient value in equalizer 56 at one unit. Device 30 initializes the coefficient value in equalizer 36 to zero units.

When equalization change request block 19 in device 10 requests a boost of one unit, analyzer front-end 50 forwards this request to device 30 but leaves the coefficient value in equalizer 56 at one unit. Equalization changer 37 in device 30 boosts the coefficient in equalizer 36 one unit. This happens three times until the coefficient in equalizer 56 is still at one unit and the coefficient in equalizer 36 is at three units.

When equalization change request block 19 in device 10 requests for the fourth time a boost of one unit, analyzer front-end 50 forwards this request to device 30 and equalization changer 57 boosts the coefficient value in equalizer 56 one unit. Now the coefficient in equalizer 56 is at two units and the coefficient in equalizer 36 is at four units, which are the predetermined optimized values.

The same result can be achieved if analyzer front-end 50 defines a unit step to be ¼ as large as the DUT unit step. In either case analyzer front-end 50 is dividing its output by four, either by incrementing once per every 4 requests, or by using a step size that is ¼ as large. The following equation is used for determining the initial equalization offset used by analyzer front-end 50 when analyzer front-end 50 divides each request by 4:

$$AITx = D10Rx - (ADRx/4 - D30Tx),$$

where AITx is the analyzer initial transmit value for a coefficient in equalizer 56, D10Rx is the predetermined optimized coefficient value for device 10 to receive from equalizer 56, ADRx is the predetermined optimized value for the analyzer to receive from equalizer 36 and D30Tx is the initial value for the coefficient that device 10 requests to be transmitted by equalizer 36. While the above example shows analyzer front-end 50 reducing its transmission equalization response to ¼ of a normal step, the reduction could be any fraction of a unit.

While in the above examples, equalization changer 57 of analyzer front-end 50 ignored the initial offset request, by varying the amount of boost to be placed in equalizer 56 (either as a multiple or a fraction of a normal boost step), it is possible to use the initial offset provided by equalization change request block 19 and still steer equalization instructions from device 10 so as to simultaneously arrive at the predetermined optimized values in equalizer 56 and equalizer 37.

Analyzer front-end 50 can also steer the Tx Training process by placing equalization coefficients in equalizer 56 that will result in poor transmission equalization. This allows analyzer front-end to obtain equalization change requests that when forwarded will result in the equalization desired by analyzer front-end 50.

For example, if an equalization change request block 19 results in a change to an equalization coefficient in equalizer 36 that results in worsening transmissions from device 30 to analyzer front-end 50, analyzer front-end 50 can place a known bad value in equalizer 56 that will cause equalization change request block 19 to send an equalization change request that changes the equalization coefficient in equalizer 36 in the opposite direction, thus steering the changes in the improved direction. Alternatively, equalizer 56 can just transmit bad data to device 10.

One way analyzer front-end 50 can transmit bad data to device 10 is to force the plus and minus signals of the differential wire pair 53 to the same voltage, which in the SAS protocol is called electrical idle. Other methods for transmitting bad data include adding lots of timing jitter to the signals, or inverting the data so that zeros are ones and ones are zeros, or simply reducing the transmitter output voltage to near zero volts.

When optimized equalization settings are not calculated beforehand, optimum equalization settings for the equalizers in device 10, device 30 and analyzer front-end 50 can be achieved by analyzer front-end 50 making the steering decisions on-the-fly during the training process. This is done, for example, by enabling analyzer front-end 50 to analyze the quality of the incoming signals during training and steering the training requests so that analyzer front-end 50 receiver channel gets the equalization change requests that will result in optimal equalization for transmissions to analyzer front-end 50.

For example, as shown in FIG. 3, a signal quality detector 58 and a signal quality detector 68 can be included within analyzer front-end 50. Signal quality detector 58 evaluates signal quality of transmissions from device 30 to analyzer front-end 50. Equalization changer 57 uses this information on signal quality when making changes to values within equalizer 56. Likewise, signal quality detector 68 evaluates signal quality of transmissions from device 10 to analyzer front-end 50. Equalization changer 67 uses this information on signal quality when making changes to values within equalizer 66.

The quality of the signal can be determined in the digital domain, analog domain, or both the digital and the analog domains. In the analog domain, a common method of measuring signal quality is to measure the timing and amplitude margin. Such signal analysis techniques are well known, and generally involve sampling each bit at various amplitude offsets and timing offsets with respect to the center of the bit in time and amplitude, to determine the time margin and amplitude margin. Multiple samples can be taken in parallel on a single bit at once, or the many samples needed could be taken serially by sampling each bit in a different timing or amplitude position. In the digital domain, errors can be detected in the encoding. SAS uses the 8b/10b coding, which is common in high-speed serial busses. When using 8b/10b coding, coding errors and disparity errors are easily detected in the digital domain. To determine optimized settings using digital error detection, signal quality detector 58 of analyzer front-end 50 measures the number of errors it receives for each transmission equalization setting requested by device 10, and looks for a range of settings that produce zero errors. An optimized transmission equalization setting will be in the middle of a range or window of error-free transmission equalization settings.

During the training process, analyzer front-end 50 can steer the requests using some of the same techniques discussed earlier, including exaggerating transmission equalization responses in order to reduce the number of further requests in the current direction (increment or decrement), reducing transmission equalization responses in order to increase the number of responses in the current direction, or forcing bad data in order to immediately stop further requests in the current direction.

Figure 5:
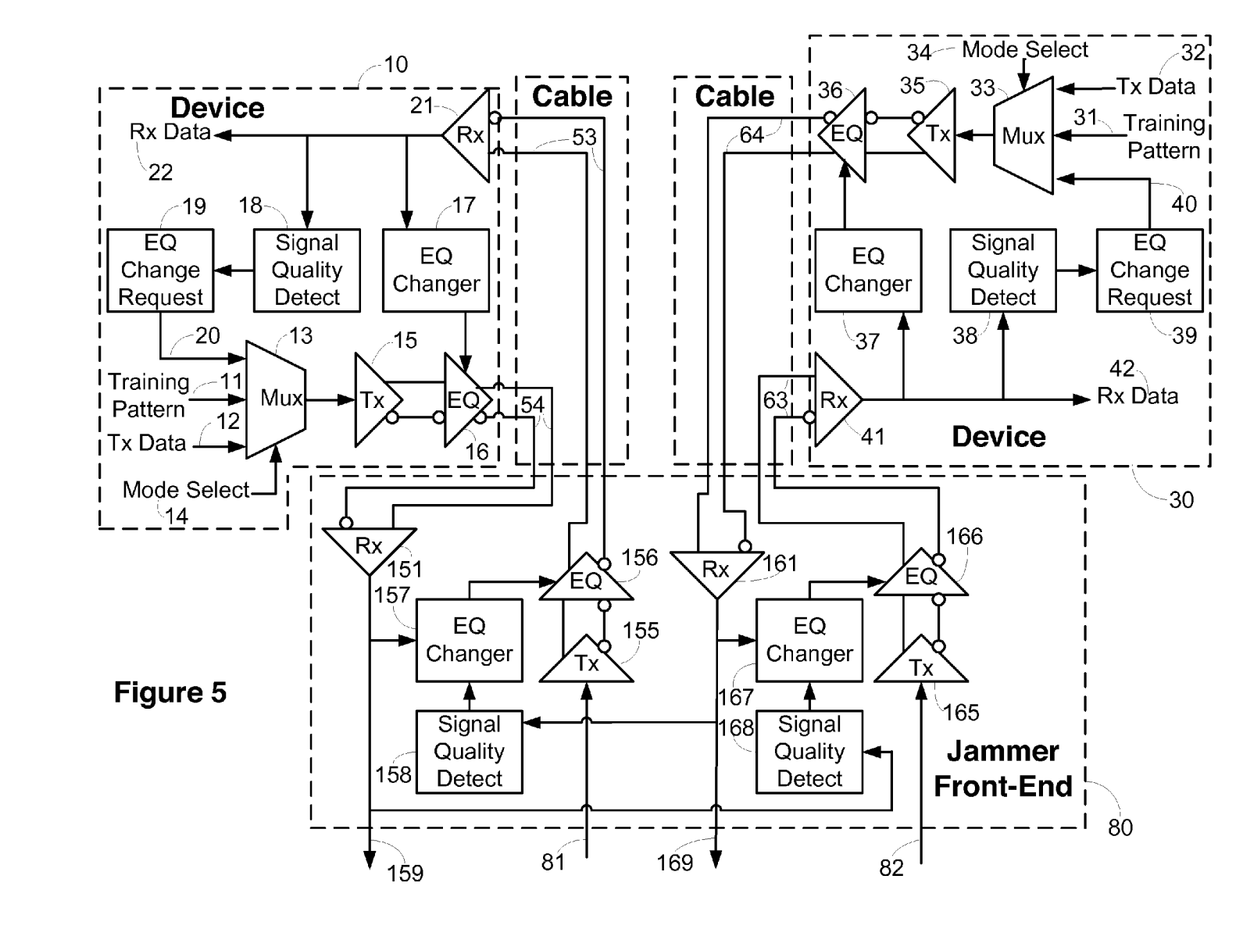
FIG. 5 is a simplified block diagram of a jammer placed so as to receive and retransmit signals exchanged over the point-to-point bus shown in FIG. 2 in accordance with an implementation.

FIG. 5 also shows mid-bus test equipment intercepting communications between device 10 and device 30. Particularly, as shown in FIG. 5, the mid-bus test equipment is a jammer and a jammer front end 80 intercepts communications between device 10 and device 30. A jammer, also called an error injector or bus modifier, is a type of mid-bus test equipment that is used to perform on-the-fly modifications of bus traffic. Jammers allow a user to create error conditions or other unusual conditions on a bus. A jammer is often used to verify that error recovery procedures work properly, or to verify the correct handling of protocol sequences that may be easier to create with a jammer than with other types of equipment that are not mid-bus test equipment such as traffic generators, device emulators or other standard devices, As shown in FIG. 5, jammer front end 80 includes a receiver 151, a transmitter 155, an equalizer 156, an equalization changer 157, a signal quality detect 158, a tap 159, a receiver 161, a transmitter 165, an equalizer 166, an equalization changer 167, a signal quality detect 168, a tap 169 connected as shown.

The difference between the analyzer front-end 50 shown in FIG. 3 and the jammer front-end 80 shown in FIG. 5, is that jammer front-end 80 does not directly route received signals 159 and 169 to transmitters 155 and 165, but instead signals 159 and 169 are sent to jammer logic which is used to recognize traffic patterns and modify them as programmed by the user. As a result of modifying the traffic, the data on lines 81 and 82, generated by the jammer, will usually be retimed, or in other words, transmitted from a new clock source, whereas retiming is less likely to be used by analyzer front-end 50. Aside from this difference, all of the previous discussion pertaining to changing the quality of transmissions and steering the request of a device apply to the jammer front-end 80 just as they apply to the analyzer front-end 50, and can be applied to many other types of mid-bus test equipment represented in FIG. 1 by mid-bus test equipment 8.

The foregoing discussion discloses and describes merely exemplary methods and implementations. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

We claim:

1. A method for testing a point-to-point connection between a first device and a second device, comprising:
   placing mid-bus test equipment between the first device and the second device so as to break the point-to-point connector into two separate point-to-point segments; and, simulating a training mode for the point-to-point connection between the first device and the second device, including:
equalizing transmissions from the mid-bus test equipment to the first device and from the second device to the mid-bus test equipment, including:
passing equalization instructions from the first device through the mid-bus test equipment to the second device, and
changing quality of transmissions from the mid-bus test equipment to the first device in order to steer the first device to produce equalization instructions that will produce optimized transmissions from the mid-bus test equipment to the first device and from the second device to the mid-bus test equipment.

2. A method as in claim 1 wherein changing quality of transmissions from the mid-bus test equipment to the first device in order to steer the first device includes choosing an initial value for an equalization coefficient within the mid-bus test equipment that is different than an initial value for the equalization coefficient contained in equalization instructions passed from the first device through the mid-bus test equipment to the second device.

3. A method as in claim 1 wherein changing quality of transmissions from the mid-bus test equipment to the first device in order to steer the first device includes choosing an adjustment for an equalization coefficient used within the mid-bus test equipment that is different than an adjustment for the equalization coefficient contained in equalization instructions passed from the first device through the mid-bus test equipment to the second device.

4. A method as in claim 1 wherein changing quality of transmissions from the mid-bus test equipment to the first device includes utilizing previously determined values for equalization coefficients that will produce optimized transmissions from the mid-bus test equipment to the first device and from the second device to the mid-bus test equipment.

5. A method as in claim 1 wherein changing quality of transmissions from the mid-bus test equipment to the first device in order to steer the first device includes monitoring quality of transmissions from the second device to the mid-bus test equipment.

6. A method as in claim 1 wherein changing quality of transmissions from the mid-bus test equipment to the first device in order to steer the first device includes choosing an adjustment for an equalization coefficient used within the mid-bus test equipment that is a multiple of an adjustment for the equalization coefficient contained in equalization instructions passed from the first device through the mid-bus test equipment to the second device.

7. A method as in claim 1 wherein changing quality of transmissions from the mid-bus test equipment to the first device in order to steer the first device includes choosing an adjustment for an equalization coefficient used within the mid-bus test equipment that is a fraction of an adjustment for the equalization coefficient contained in equalization instructions passed from the first device through the mid-bus test equipment to the second device.

8. Mid-bus test equipment comprising:
a first receiver for receiving transmissions from a first device;
a second receiver for receiving transmissions from a second device;
a first transmitter for transmitting to the first device;
a first equalizer for equalizing transmissions to the first device;
a second transmitter for transmitting to the second device;
a second equalizer for equalizing transmissions to the second device;
a first communication path from the first receiver to the second transmitter;
a second communication path from the second receiver to the first transmitter;
a first equalization changer that changes coefficients within the first equalizer; and,
a second equalization changer that changes coefficients within the second equalizer;
wherein equalization instructions from the first device are forwarded by the mid-bus test equipment to the second device;
wherein equalization instructions from the second device are forwarded by the mid-bus test equipment to the first device; and,
wherein transmission quality of transmissions from the first transmitter to the first device is changed in order to steer the first device to produce equalization instructions that will produce optimized transmissions from the mid-bus test equipment to the first device and from the second device to the mid-bus test equipment.

9. Mid-bus test equipment as in claim 8 wherein the second equalization changer changes values in the second equalizer in order to steer the first device to produce equalization instructions that will produce optimized transmissions from the mid-bus test equipment to the first device and from the second device to the mid-bus test equipment.

10. Mid-bus test equipment as in claim 8 wherein the first equalization changer places an initial value for an equalization coefficient within the first equalizer that is different than an initial value for the equalization coefficient contained in equalization instructions forwarded from the first device through the mid-bus test equipment to the second device.

11. Mid-bus test equipment as in claim 8 wherein the first equalization changer adjusts an equalization coefficient within the first equalizer differently than an adjustment for the equalization coefficient requested in equalization instructions forwarded from the first device through the mid-bus test equipment to the second device.

12. Mid-bus test equipment as in claim 8 wherein the mid-bus test equipment sends intentionally bad data to the first device in response to equalization instructions forwarded from the first device through the mid-bus test equipment to the second device in order to steer the first device to produce equalization instructions that will produce optimized transmissions from the mid-bus test equipment to the first device and from the second device to the mid-bus test equipment.

13. Mid-bus test equipment as in claim 8 wherein the mid-bus test equipment utilizes previously determined values for equalization coefficients that will produce optimized transmissions from the mid-bus test equipment to the first device and from the second device to the mid-bus test equipment in order to select values used in the first equalizer in order to steer the first device.

14. Mid-bus test equipment as in claim 8 additionally comprising:
a first signal quality detector that detects signal quality of transmissions from the second device to the mid-bus test equipment in order to provide information used to steer the first device.

15. Mid-bus test equipment comprising:
a first transmitter for transmitting to a first device; and,
a first equalization changer that changes equalization for transmissions to the first device;
wherein the mid-bus test equipment simulates a training mode for a point-to-point connection between the first device and a second device by forwarding equalization instructions from the first device to the second device, and by changing transmission quality of transmissions from the first transmitter to the first device in order to steer the first device to produce equalization instructions that will produce optimized transmissions from the mid-bus test equipment to the first device and from the second device to the mid-bus test equipment.

16. Mid-bus test equipment as in claim 15 wherein the mid-bus test equipment utilizes previously determined values for equalization coefficients that will produce optimized transmissions from the mid-bus test equipment to the first device and from the second device to the mid-bus test equipment in order to change equalization for transmissions to the first device in order to steer the first device to produce equalization instructions.

17. Mid-bus test equipment as in claim 15 wherein the first equalization changer initializes equalization for transmissions to the first device places at an initial value different than an initial value for equalization contained in equalization instructions forwarded from the first device through the mid-bus test equipment to the second device.

18. A method for equalizing transmissions from mid-bus test equipment to a first device and from a second device to the mid-bus test equipment, the method comprising:

passing equalization instructions from the first device through the mid-bus test equipment to the second device; and, changing quality of transmissions from the mid-bus test equipment to the first device in order to steer the first device to produce equalization instructions that will produce optimized transmissions from the mid-bus test equipment to the first device and from the second device to the mid-bus test equipment;

wherein changing quality of transmissions from the mid-bus test equipment to the first device in order to steer the first device includes sending intentionally bad data from mid-bus test equipment to the first device in response to equalization instructions passed from the first device through the mid-bus test equipment to the second device.

19. Mid-bus test equipment comprising:

a first transmitter for transmitting to a first device; and, a first equalization changer that changes equalization for transmissions to the first device;

wherein equalization instructions from the first device are forwarded by the mid-bus test equipment to a second device;

wherein transmission quality of transmissions from the first transmitter to the first device is changed in order to steer the first device to produce equalization instructions that will produce optimized transmissions from the mid-bus test equipment to the first device and from the second device to the mid-bus test equipment; and, wherein transmission quality of transmissions from the first transmitter to the first device is changed in at least one of the following ways:

forcing an electrical idle state during the transmissions;

adding timing jitter to the transmissions;

reducing output amplitude of the transmissions.

20. Mid-bus test equipment comprising:

a first transmitter for transmitting to a first device; and, a first equalization changer that changes equalization for transmissions to the first device;

wherein equalization instructions from the first device are forwarded by the mid-bus test equipment to a second device;

wherein transmission quality of transmissions from the first transmitter to the first device is changed in order to steer the first device to produce equalization instructions that will produce optimized transmissions from the mid-bus test equipment to the first device and from the second device to the mid-bus test equipment; and, wherein the mid-bus test equipment sends intentionally bad data to the first device in response to equalization instructions forwarded from the first device through the mid-bus test equipment to the second device in order to steer the first device to produce equalization instructions that will produce optimized transmissions from the mid-bus test equipment to the first device and from the second device to the mid-bus test equipment.

* * * * *